(12) United States Patent
Ishi

(10) Patent No.: US 12,092,454 B2
(45) Date of Patent: Sep. 17, 2024

(54) ABSOLUTE ENCODER, NON-TRANSITORY STORAGE THAT STORES A PROGRAM FOR OUTPUTTING ANGLE ERROR INFORMATION OF ABSOLUTE ENCODER, AND METHOD FOR OUTPUTTING ANGLE ERROR INFORMATION OF ABSOLUTE ENCODER

(71) Applicant: MINEBEA MITSUMI Inc., Nagano (JP)

(72) Inventor: Yujin Ishi, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 155 days.

(21) Appl. No.: 17/759,730

(22) PCT Filed: Jan. 27, 2021

(86) PCT No.: PCT/JP2021/002841
§ 371 (c)(1),
(2) Date: Jul. 29, 2022

(87) PCT Pub. No.: WO2021/153613
PCT Pub. Date: Aug. 5, 2021

(65) Prior Publication Data
US 2023/0332877 A1    Oct. 19, 2023

(30) Foreign Application Priority Data

Jan. 31, 2020 (JP) .................................. 2020-015092

(51) Int. Cl.
*G01B 7/30* (2006.01)
*G01D 5/14* (2006.01)

(52) U.S. Cl.
CPC ............... *G01B 7/30* (2013.01); *G01D 5/145* (2013.01); *G01D 2205/26* (2021.05); *G01D 2205/28* (2021.05)

(58) Field of Classification Search
CPC .................................. G01B 7/30; G01D 5/145
See application file for complete search history.

(56) References Cited

U.S. PATENT DOCUMENTS

| 11,561,117 | B2 * | 1/2023 | Osada ..................... G01D 5/245 |
| 2012/0146630 | A1 * | 6/2012 | Itomi ..................... G01D 5/145 |
| | | | 324/207.25 |

(Continued)

FOREIGN PATENT DOCUMENTS

| JP | 2006-029937 A | 2/2006 |
| JP | 2013-120090 A | 6/2013 |

(Continued)

OTHER PUBLICATIONS

International Search Report for corresponding International Application No. PCT/JP2021/002841 mailed Mar. 23, 2021.

(Continued)

*Primary Examiner* — Reena Aurora
(74) *Attorney, Agent, or Firm* — Pearne & Gordon LLP

(57) ABSTRACT

To correct an error based on a position of a main spindle. An absolute encoder includes a magnet as a permanent magnet provided at a leading end side of a first worm gear part, an angle sensor as an angle sensor configured to detect a rotation angle of the first worm gear part corresponding to a change in a magnetic flux generated from the magnet, a microcomputer configured to output angle position information of a first driving gear in a stopped state, wherein the microcomputer outputs angle error information of the first driving gear corresponding to the angle position information.

7 Claims, 17 Drawing Sheets

(56) References Cited

U.S. PATENT DOCUMENTS

2014/0354267 A1    12/2014  Sakai et al.
2017/0315146 A1*   11/2017  Koeck .................... G01L 3/101
2020/0280245 A1     9/2020  Osada et al.

FOREIGN PATENT DOCUMENTS

| JP | 2014-232048 A | 12/2014 |
| JP | 2016-099164 A | 5/2016 |
| JP | 2018-076068 A | 5/2018 |
| WO | 2019/059173 A1 | 3/2019 |

OTHER PUBLICATIONS

Written Opinion for corresponding International Application No. PCT/JP2021/002841 dated Mar. 23, 2021 and English translation.

* cited by examiner

US 12,092,454 B2

ABSOLUTE ENCODER, NON-TRANSITORY STORAGE THAT STORES A PROGRAM FOR OUTPUTTING ANGLE ERROR INFORMATION OF ABSOLUTE ENCODER, AND METHOD FOR OUTPUTTING ANGLE ERROR INFORMATION OF ABSOLUTE ENCODER

CROSS-REFERENCE TO RELATED APPLICATIONS

This application is a national stage entry of International Application No. PCT/JP2021/002841 filed on Jan. 27, 2021, which claims the benefit of priority to Japanese Application No. JP2020-015092, filed Jan. 31, 2020, the entire disclosures of which are hereby incorporated herein by reference.

TECHNICAL FIELD

The present invention relates to an absolute encoder, a program for outputting angle error information of an absolute encoder, and a method for outputting angle error information of an absolute encoder.

BACKGROUND ART

In the related art, a known rotary encoder is used for detecting a position and an angle of a movable element in various control mechanical devices. Examples of such a rotary encoder include an incremental encoder for detecting a relative position or angle and an absolute encoder for detecting an absolute position or angle.

In such an absolute encoder, for example, a technology of calculating a speed ratio between a rotational speed and a specific rotational speed in a usage state and calculating, from a correction amount stored in a correction amount table, a correction value corresponding to the calculated speed ratio and a division angle position has been disclosed (for example, see PTL 1).

CITATION LIST

Patent Literature

PTL 1: JP 2016-99164 A

SUMMARY OF INVENTION

Technical Problem

The absolute encoder uses a position (angle) of a main spindle at the time of start-up as a reference and detects a position of a rotating shaft by the amount of rotation of a motor from the reference. However, the absolute encoder may include an error in the position (angle) of the main spindle due to manufacturing variations and the like. The error of the angle of the absolute encoder also changes depending on the positional relationship of a magnet or a magnetic sensor to be used for detecting the position of the rotating shaft.

The present invention has been made in view of the above-described problems, and an object of the present invention is to provide an absolute encoder capable of correcting an error based on a position of a main spindle.

Solution to Problem

To achieve the above-described object, an absolute encoder according to the present invention includes a first driving gear configured to rotate according to rotation of a main spindle, a permanent magnet rotatable together with the first driving gear, an angle sensor configured to detect a rotation angle of the first driving gear corresponding to a change in a magnetic flux generated from the permanent magnet, a microcomputer unit configured to output angle position information of the first driving gear in a stopped state, wherein the microcomputer outputs angle error information of the first driving gear corresponding to the angle position information.

Advantageous Effects of Invention

The absolute encoder according to the present invention allows an error based on a position of a main spindle to be corrected.

DESCRIPTION OF EMBODIMENTS

Figure 1:
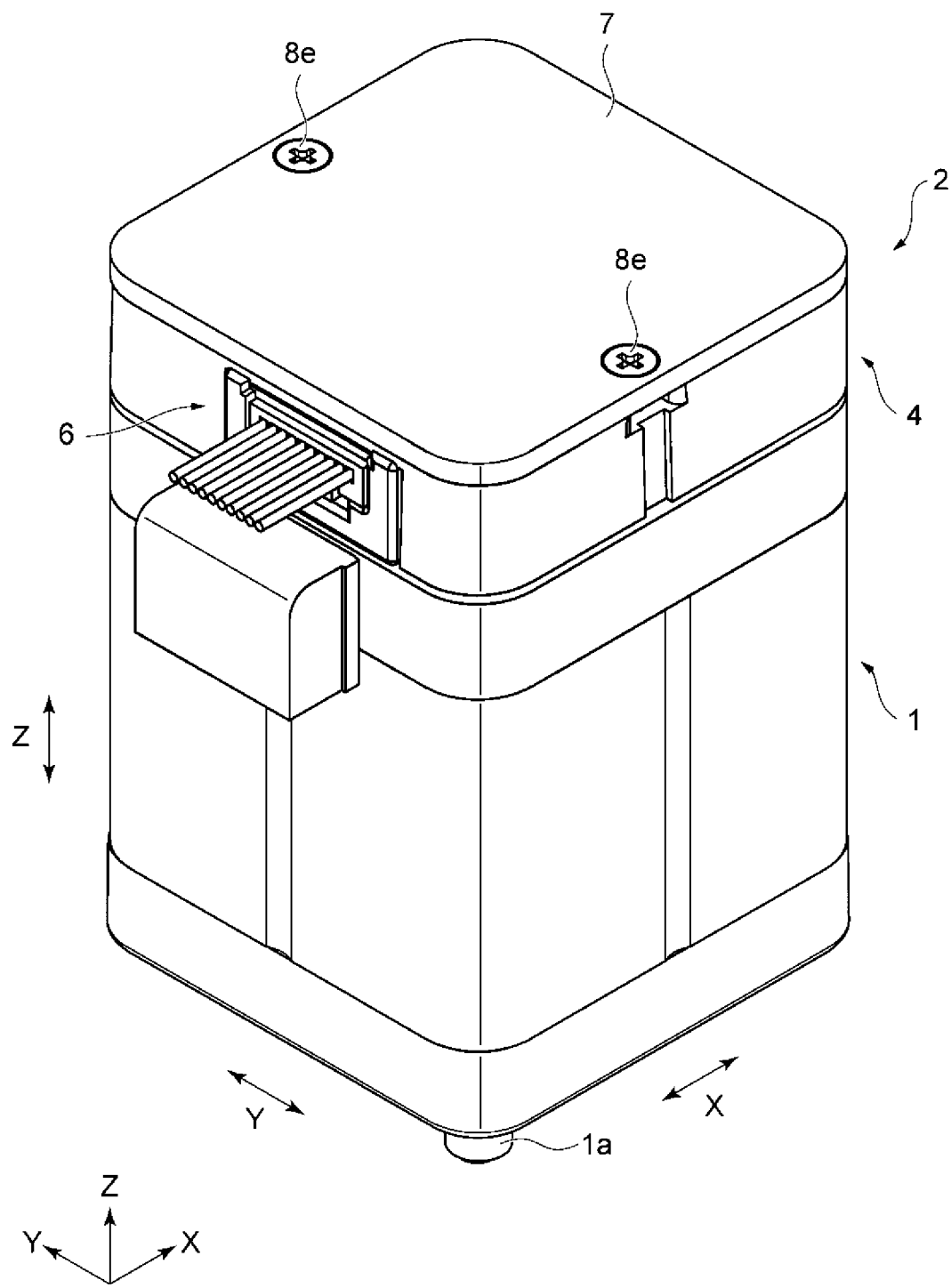
FIG. 1 is a perspective view schematically illustrating the configuration of an absolute encoder according to an embodiment of the present invention.

The present inventor has found that in an absolute encoder, the amount of rotation over a plurality of numbers of rotations (hereinafter, also referred to as a plurality of rotations) of the main spindle (hereinafter, also referred to as the amount of rotation of a main spindle) can be specified by acquiring the rotation angle of a rotating body configured to decelerate and rotate with the rotation of the main spindle. That is, the amount of rotation of the main spindle can be specified by multiplying the rotation angle of the rotating body by a reduction ratio. The specifiable range of the amount of rotation of the main spindle increases in proportion to the reduction ratio. For example, when the reduction ratio is 50, the amount of rotation for 50 rotations of the main spindle can be specified.

On the other hand, the required resolution of the rotating body decreases in proportion to the reduction ratio. For example, when the reduction ratio is 100, the resolution required for the rotating body per rotation of the main spindle is 3.6° (=360°/100), and the detection accuracy of ±1.8° is required. On the other hand, when the reduction ratio is 50, the resolution required for the rotating body per rotation of the main spindle is =7.2° (360°/50), and the detection accuracy of ±3.6° is determined.

Embodiments of the present invention are described below with reference to the drawings. In each of the embodiments and modifications to be described below, the same or equivalent components and members are denoted by the same reference numerals, and duplicate description will be omitted as appropriate. Furthermore, the dimensions of the members in each drawing are appropriately enlarged or reduced in order to facilitate understanding. Furthermore, some of members not important for explaining the embodiment in each drawing are omitted and displayed. Furthermore, in the drawings, gears are illustrated by omitting a tooth shape. Furthermore, terms including ordinal numbers such as $1^{st}$ and $2^{nd}$ are used for describing various components, but the terms are used only for the purpose of distinguishing one component from other components, and components are not limited by the terms. The present invention is not limited by the present embodiment.

Figure 2:
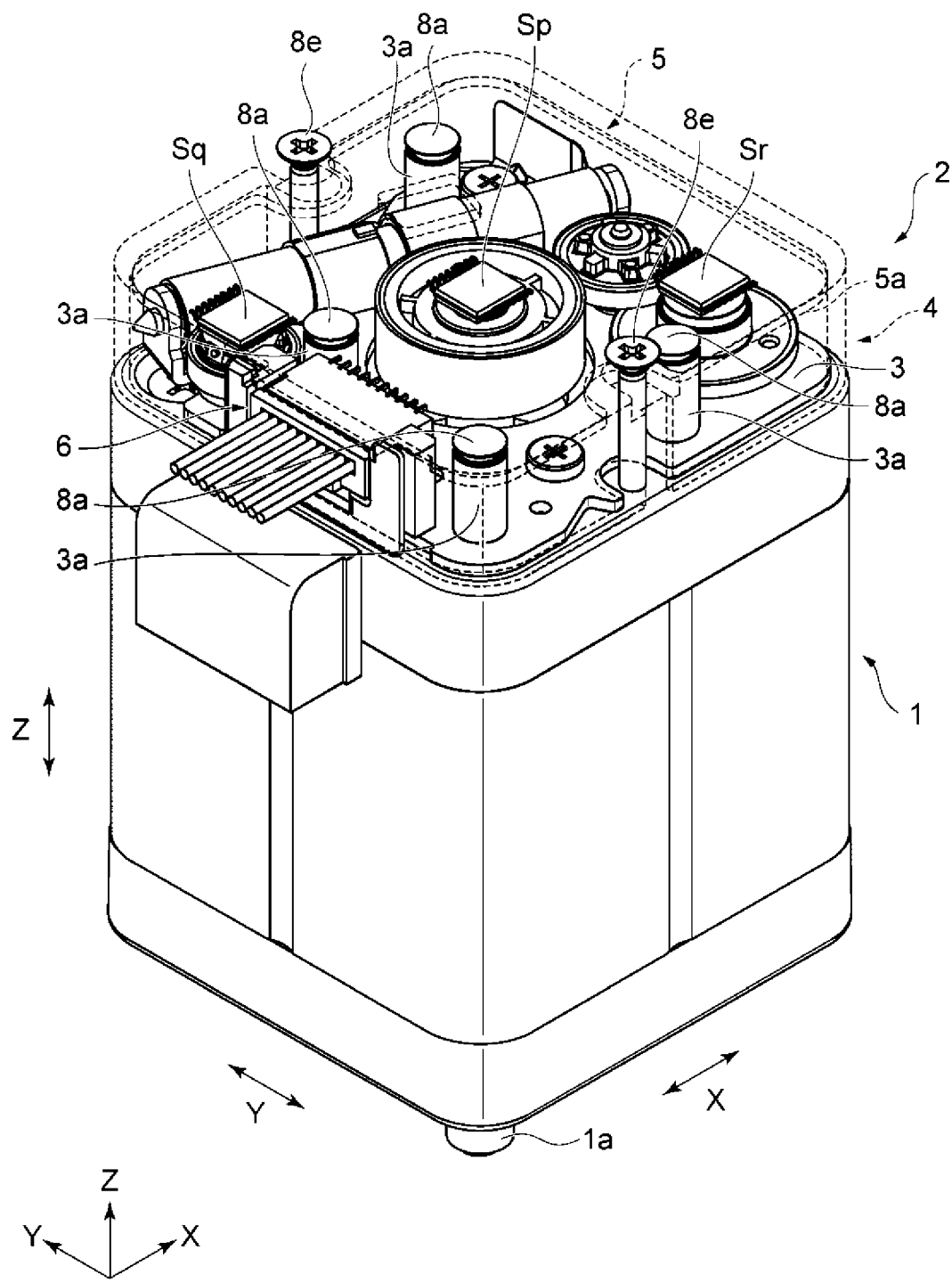
FIG. 2 is a perspective view schematically illustrating the configuration of the absolute encoder illustrated in FIG. 1 with a shield plate removed.
Figure 3:
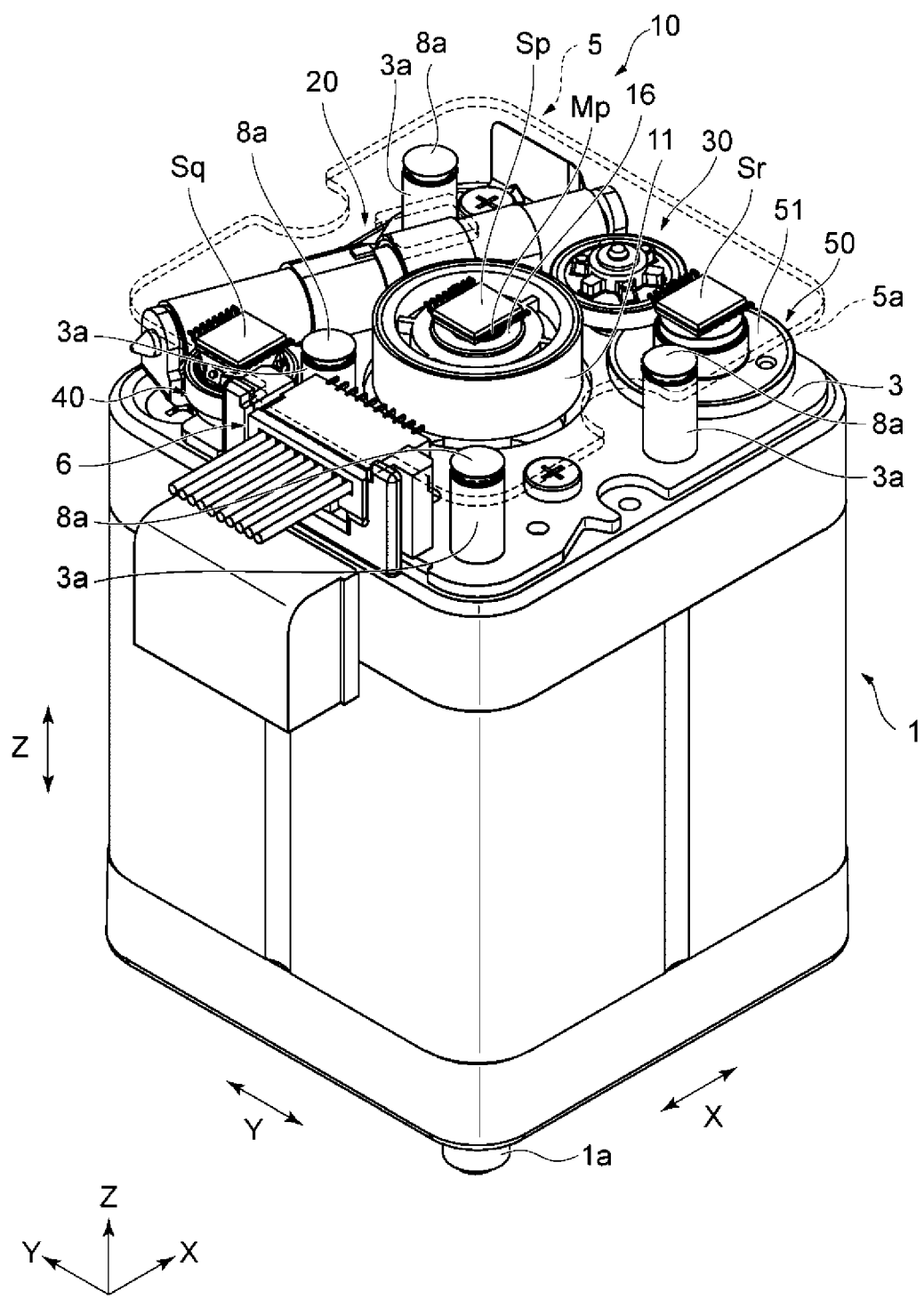
FIG. 3 is a perspective view schematically illustrating the configuration of the absolute encoder illustrated in FIG. 2 with a case removed.
Figure 4:
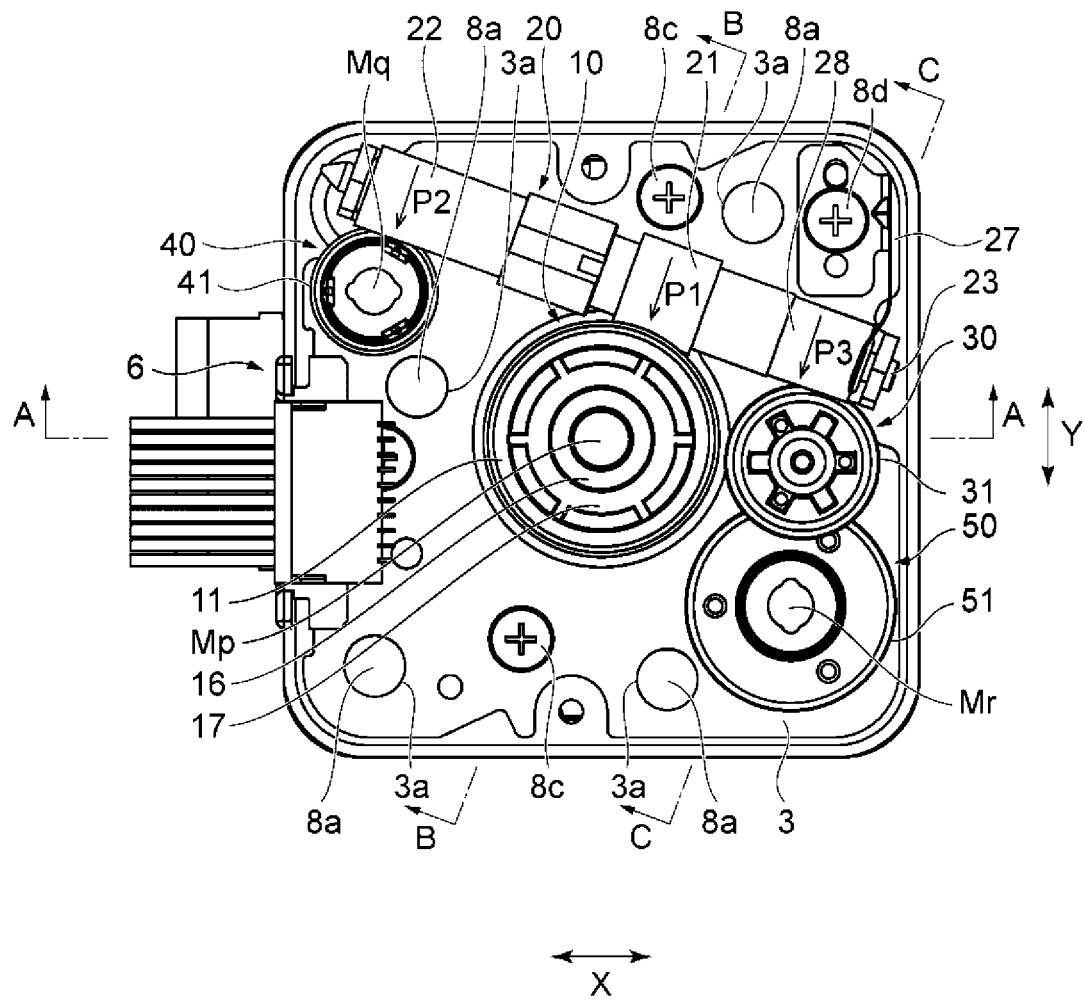
FIG. 4 is a plan view schematically illustrating the configuration of the absolute encoder illustrated in FIG. 3 with a substrate removed.

FIG. 1 is a perspective view schematically illustrating the configuration of an absolute encoder 2 according to an embodiment of the present invention. FIG. 2 is a perspective view schematically illustrating the configuration of the absolute encoder 2 with a shield plate 7 removed. In FIG. 2, a case 4 and an angle sensor support substrate 5 of the absolute encoder 2 are transparently illustrated. FIG. 3 is a perspective view schematically illustrating the configuration of the absolute encoder 2 with the case 4 removed. In FIG. 3, the angle sensor support substrate 5 of the absolute encoder 2 is transparently illustrated. FIG. 4 is a plan view schematically illustrating the configuration of the absolute encoder 2 with the angle sensor support substrate 5 removed.

As illustrated in FIG. 1 to FIG. 4, the absolute encoder 2 according to an embodiment of the present invention includes a first worm gear part 11, a magnet Mp, an angle sensor Sp, a first worm wheel part 21, a second worm gear part 22, a second worm wheel part 41, a magnet Mq, an angle sensor Sq, and a gear base part 3. The first worm gear part 11 is a first driving gear and rotates according to the rotation of a main spindle 1a. The magnet Mp is provided as a first permanent magnet on a leading end side of the first worm gear part 11. The angle sensor Sp is a first angle sensor and detects a rotation angle of the first worm gear part 11 corresponding to a change in a magnetic flux generated from the magnet Mp. The first worm wheel part 21 is a first driven gear, has a central axis orthogonal to a central axis of the first worm gear part 11, and meshes with the first worm gear part 11. The second worm gear part 22 is a second driving gear, is provided coaxially with the first worm wheel part 21, and rotates according to the rotation of the first worm wheel part 21. The second worm wheel part 41 is a second driven gear, has a central axis orthogonal to the central axis of the first worm wheel part 21, and meshes with the second worm gear part 22. The magnet Mq is provided as a second permanent magnet on a leading end side of the second worm wheel part 41. The angle sensor Sq is a second angle sensor and detects a rotation angle of the second worm wheel part 41 corresponding to a change in a magnetic flux generated from the magnet Mq. The absolute encoder 2 includes a table processing unit 121b, a rotation amount specifying unit 121c, and an output unit 121e. The table processing unit 121b, the rotation amount specifying unit 121c, and the output unit 121e function as an angle position information output unit configured to output angle position information of the first worm gear part 11 in a stopped state and an angle error information output unit configured to output angle error information of the first worm gear part 11 corresponding to the angle position information. Hereinafter, the structure of the absolute encoder 2 is specifically described.

In the present embodiment, for convenience of description, the absolute encoder 2 is described based on an XYZ orthogonal coordinate system. The X-axis direction corresponds to a horizontal left-right direction, the Y-axis direction corresponds to a horizontal front-rear direction, and the Z-axis direction corresponds to a vertical direction. The Y-axis direction and the Z-axis direction are orthogonal to the X-axis direction, respectively. In the present description, the X-axis direction is also referred to as a left side or a right side, the Y-axis direction is also referred to as a front side or a rear side, and the Z-axis direction is also referred to as an upper side or a lower side. In the orientation of the absolute encoder 2 illustrated in FIGS. 1 and 2, a left side in the X-axis direction is the left side and a right side in the X-axis direction is the right side. Furthermore, in the orientation of the absolute encoder 2 illustrated in FIGS. 1 and 2, a front side in the Y-axis direction is the front side and a back side in the Y-axis direction is the rear side. Furthermore, in the orientation of the absolute encoder 2 illustrated in FIGS. 1 and 2, an upper side in the Z-axis direction is on the upper side and a lower side in the Z-axis direction is the lower side. A state when viewed from the upper side in the Z-axis direction is referred to as a plan view, a state when viewed from the front side in the Y-axis direction is referred to as a front view, and a state when viewed from the left side in the X-axis direction is referred to as a side view. The notation for such directions does not limit the usage orientation of the absolute encoder 2, and the absolute encoder 2 may be used in any orientation.

As described above, the absolute encoder 2 is an absolute encoder configured to specify and output the amount of rotation over a plurality of rotations of the main spindle 1a of a motor 1. In an embodiment of the present invention, the absolute encoder 2 is provided at an upper end part of the motor 1 in the Z-axis direction. In the embodiment of the present invention, the absolute encoder 2 has a substantially rectangular shape in the plan view and has a thin and horizontally long rectangular shape in the vertical direction, that is, the extension direction of the main spindle 1a in the front view and the side view. That is, the absolute encoder 2 has a flat rectangular parallelepiped shape longer in the horizontal direction than in the vertical direction.

The absolute encoder 2 includes the case 4 having a hollow square tubular shape and accommodating an internal structure. The case 4 includes a plurality of (for example, four) outer wall portions 4a surrounding at least a part of the main spindle 1a of the motor 1, a main spindle gear 10, a first intermediate gear 20, a second intermediate gear 30, a first sub-shaft gear 40, a second sub-shaft gear 50, and the like, and has an open upper end part. In the case 4, the shield plate 7 serving as a magnetic flux shielding member and being a rectangular plate-shaped member is fixed to the case 4 and the gear base part 3 by screws 8e at the upper end parts of four outer wall portions 4a opened.

The shield plate 7 is a plate-shaped member provided between the angle sensors Sp, Sq, and Sr and the outside of the absolute encoder 2 in the axial direction (Z-axis direction). The shield plate 7 is formed of a magnetic body in order to prevent magnetic interference due to a magnetic flux generated outside the absolute encoder 2 by the angle sensors Sp, Sq, and Sr provided inside the case 4.

As an example, the motor 1 may be a stepping motor or a DC brushless motor. As an example, the motor 1 may be a motor applied as a driving source for driving a robot for an industrial use or the like via a reduction mechanism such as a wave gear device. Both sides of the spindle 1a of the motor 1 in the vertical direction project from the case of the motor. The absolute encoder 2 outputs the amount of rotation of the main spindle 1a of the motor 1 as a digital signal.

The motor 1 has a substantially rectangular shape in the plan view and has a substantially rectangular shape even in the vertical direction. That is, the motor 1 has a substantially cubic shape. In the plan view, each of the four outer wall portions constituting the outer shape of the motor 1 has a length of, for example, 25 mm, that is, the outer shape of the motor 1 is 25 mm square in the plan view. Furthermore, the absolute encoder 2 provided in the motor 1 is, for example, a 25 mm square according to the outer shape of the motor 1.

In FIGS. 1 and 2, the angle sensor support substrate 5 is provided to cover the inside of the absolute encoder 2 together with the case 4 and the shield plate 7.

Figure 5:
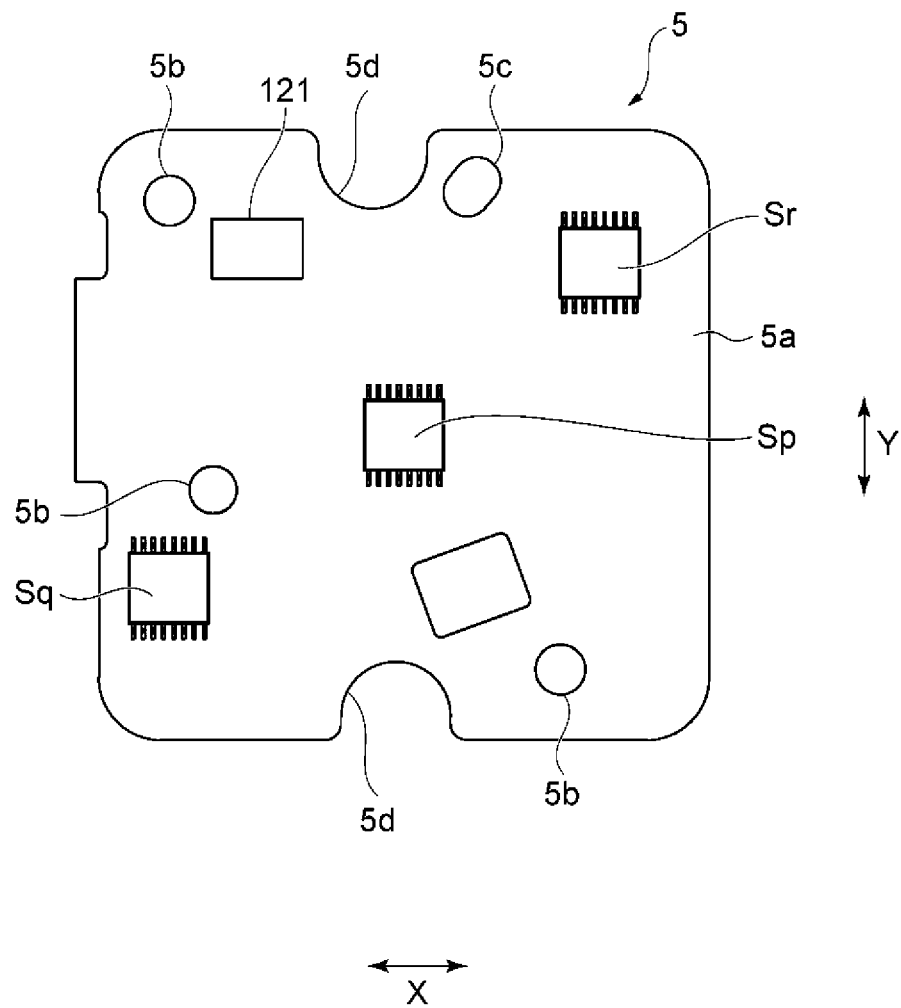
FIG. 5 is a view illustrating an angle sensor support substrate illustrated in FIG. 3 when viewed from a lower surface side.

FIG. 5 is a diagram of the angle sensor support substrate 5 when viewed from the lower side. As illustrated in FIG. 5, the angle sensor support substrate 5 has a substantially rectangular shape in the plan view and is a thin plate-shaped printed wiring substrate in the vertical direction. Furthermore, a connector 6 is connected to the angle sensor support substrate 5 and is for connecting the absolute encoder 2 and an external device (not illustrated).

As illustrated in FIGS. 2 and 3, the absolute encoder 2 includes the main spindle gear 10 having the first worm gear part 11 (first driving gear), the first intermediate gear 20 having the first worm wheel part 21 (first driven gear), the second worm gear part 22 (second driving gear), and a third worm gear part 28 (third driving gear), the second intermediate gear 30 having a third worm wheel part 31 (third driven gear) and a first spur gear part 32 (fourth driving gear), the first sub-shaft gear 40 having the second worm wheel part 41 (second driven gear), the second sub-shaft gear 50 having a second spur gear part 51 (third driven gear), the magnet Mp, the angle sensor Sp corresponding to the magnet Mp, the magnet Mq, the angle sensor Sq corresponding to the magnet Mq, a magnet Mr, an angle sensor Sr corresponding to the magnet Mr, and a microcomputer 121.

Figure 6:
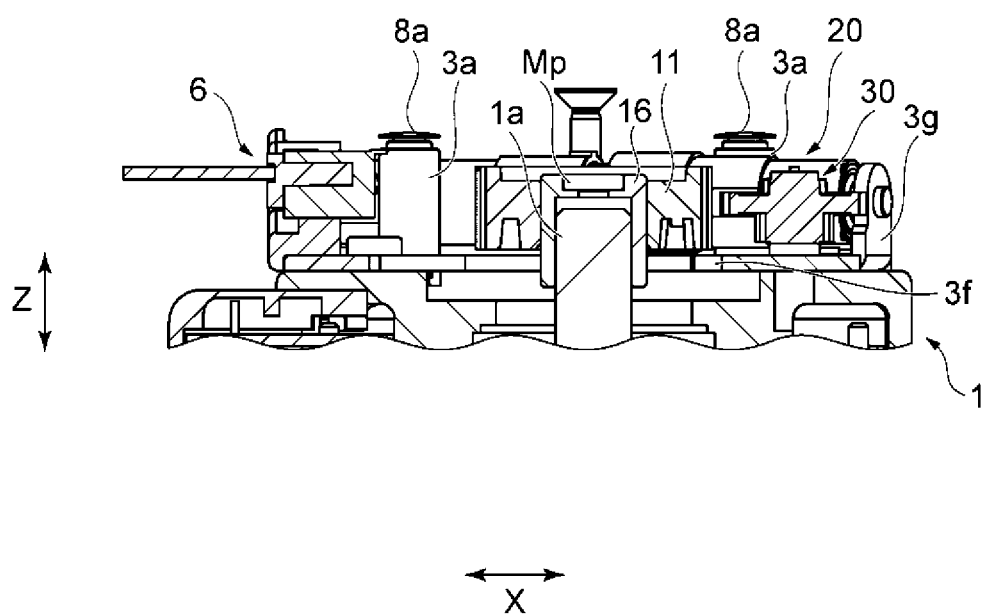
FIG. 6 is a cross-sectional view of the absolute encoder illustrated in FIG. 4 taken along line A-A.

FIG. 6 is a cross-sectional view of the absolute encoder 2 taken along line A-A.

As illustrated in FIG. 4 and FIG. 6, the main spindle 1a of the motor 1 is an output shaft of the motor 1 and is an input shaft configured to transmit a rotational force to the absolute encoder 2. The main spindle gear 10 is fixed to the main spindle 1a of the motor 1 and is rotatably supported by a bearing member of the motor 1 integrally with the main spindle 1a. The first worm gear part 11 is provided on an outer periphery of the main spindle gear 10 and rotates according to the rotation of the main spindle 1a of the motor 1. In the main spindle gear 10, the first worm gear part 11 is provided so that the central axis of the first worm gear part 11 matches or substantially matches a central axis of the main spindle 1a. The main spindle gear 10 can be formed of various materials such as a resin material or a metal material. The main spindle gear 10 is formed of, for example, a polyacetal resin.

As illustrated in FIG. 3 and FIG. 4, the first intermediate gear 20 is a gear part configured to transmit the rotation of the main spindle gear 10 to the first sub-shaft gear 40 and the second intermediate gear 30. The first intermediate gear 20 is pivotally supported by a shaft 23 around a rotation axis extending substantially parallel to a base portion 3b. The first intermediate gear 20 is a substantially cylindrical member extending in the direction of the rotation axis. The first intermediate gear 20 includes the first worm wheel part 21, the second worm gear part 22, and the third worm gear part 28, is formed therein with a through hole, and the shaft 23 is inserted into the through hole. The first intermediate gear 20 is pivotally supported by inserting the shaft 23 into first intermediate gear shaft support portions 3g provided on the base portion 3b of the gear base part 3. The first worm wheel part 21, the second worm gear part 22, and the third worm gear part 28 are disposed at positions separated from each other in this order. The first intermediate gear 20 can be formed of various materials such as a resin material or a metal material. The first intermediate gear 20 is formed of a polyacetal resin.

Figure 7:
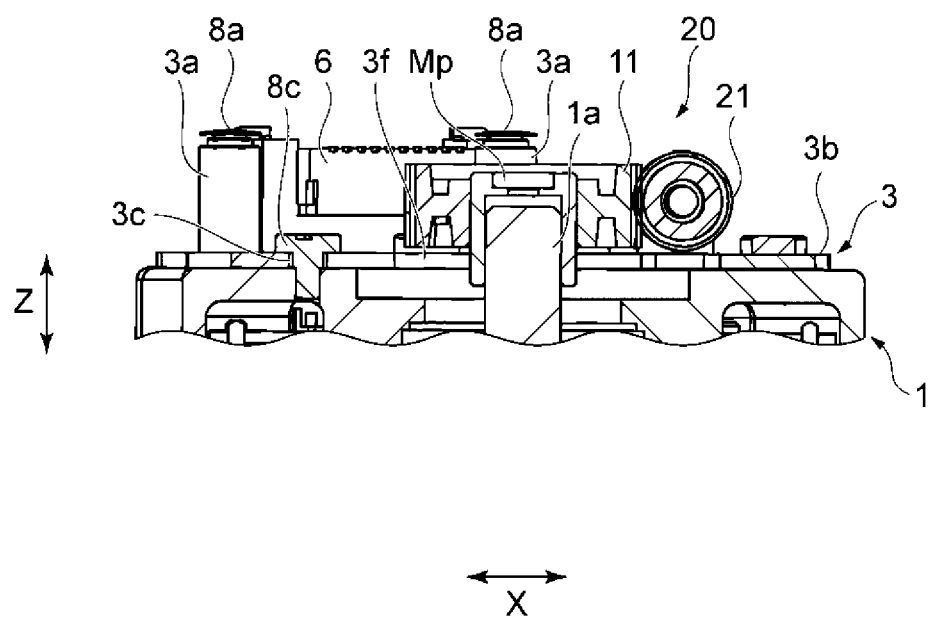
FIG. 7 is a cross-sectional view of the absolute encoder illustrated in FIG. 4 taken along line B-B.

FIG. 7 is a cross-sectional view of the absolute encoder 2 taken along line B-B.

As illustrated in FIG. 4 and FIG. 7, the first worm wheel part 21 is provided on an outer periphery of the first intermediate gear 20 and is provided to mesh with the first worm gear part 11 and rotate according to the rotation of the first worm gear part 11. An axial angle between the first worm wheel part 21 and the first worm gear part 11 is set to 90° or approximately 90°.

Although there is no special restriction on an outer diameter of the first worm wheel part 21, in the illustrated example, the outer diameter of the first worm wheel part 21 is set to be smaller than the outer diameter of the first worm gear part 11, and the outer diameter of the first worm wheel part 21 is small. With this, the absolute encoder 2 is reduced in size in the vertical direction.

The second worm gear part 22 is provided on the outer periphery of the first intermediate gear 20 and rotates with the rotation of the first worm wheel part 21. In the first intermediate gear 20, the second worm gear part 22 is provided so that a central axis of the second worm gear part 22 matches or substantially matches the central axis of the first worm wheel part 21.

Figure 8:
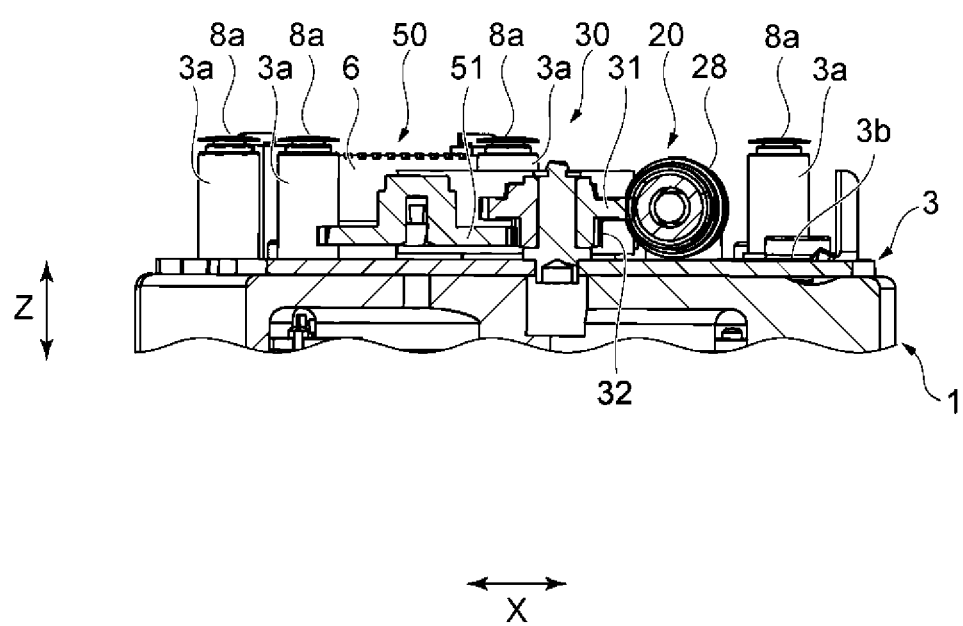
FIG. 8 is a cross-sectional view of the absolute encoder illustrated in FIG. 4 taken along line C-C.

FIG. 8 is a cross-sectional view of the absolute encoder 2 taken along line C-C.

As illustrated in FIG. 4 and FIG. 8, the third worm gear part 28 is provided on the outer periphery of the first intermediate gear 20 and rotates with the rotation of the first worm wheel part 21. In the first intermediate gear 20, the third worm gear part 28 is provided so that a central axis of the third worm gear part 28 matches or substantially matches the central axis of the first worm wheel part 21.

As illustrated in FIG. 4, the first sub-shaft gear 40 is decelerated according to the rotation of the motor shaft and rotates integrally with the magnet Mq. The first sub-shaft gear 40 is a member having a substantially circular shape in the plan view, is pivotally supported by a shaft protruding substantially vertically from the base portion 3b of the gear base part 3, and includes the second worm wheel part 41 and a holding part configured to hold the magnet Mq. The first sub-shaft gear 40 can be formed of various materials such as a resin material or a metal material. The first sub-shaft gear 40 is formed of a polyacetal resin.

The second worm wheel part 41 is provided on an outer periphery of the first sub-shaft gear 40 and is provided to mesh with the second worm gear part 22 and rotate according to the rotation of the second worm gear part 22. An axial angle between the second worm wheel part 41 and the second worm gear part 22 is set to 90° or approximately 90°. A rotation axis of the second worm wheel part 41 is provided parallel to or substantially parallel to a rotation axis of the first worm gear part 11.

In FIG. 4 and FIG. 8, the second intermediate gear 30 is a disk-shaped gear part configured to rotate according to the rotation of the main spindle 1a, decelerate the rotation of the main spindle 1a, and transmit the decelerated rotation to the second sub-shaft gear 50. The second intermediate gear 30 is provided between the second worm gear part 22 and the second spur gear part 51 provided in the second sub-shaft gear 50. The second spur gear part 51 meshes with the first spur gear part 32. The second intermediate gear 30 includes the third worm wheel part 31 configured to mesh with the third worm gear part 28 of the first intermediate gear 20, and the first spur gear part 32 configured to drive the second spur gear part 51. The second intermediate gear 30 is formed of, for example, a polyacetal resin. The second intermediate gear 30 is a substantially circular member in the plan view. The second intermediate gear 30 is pivotally supported by the base portion 3b of the gear base part 3.

Providing the second intermediate gear 30 enables the second sub-shaft gear 50 to be described below to be disposed at a position away from the third worm gear part 28. Therefore, the distance between the magnets Mp and Mq can be increased to reduce an influence of a leakage flux on the magnets Mp and Mq. Furthermore, providing the second intermediate gear 30 enables the expansion of the range allowing the reduction ratio to be set, improving the degree of freedom in design.

The third worm wheel part 31 is provided on an outer periphery of the second intermediate gear 30 and is provided to mesh with the third worm gear part 28 and rotate according to the rotation of the third worm gear part 28. The first spur gear part 32 is provided on the outer periphery of the second intermediate gear 30 so that a central axis of the first spur gear part 32 matches or substantially matches a central axis of the third worm wheel part 31. The first spur gear part 32 is provided to mesh with the second spur gear part 51 and rotate according to the rotation of the third worm wheel part 31. A rotation axis of the third worm wheel part 31 and the first spur gear part 32 is provided parallel to or substantially parallel to the rotation axis of the first worm gear part 11.

In FIG. 8, the second sub-shaft gear 50 is a gear part having a circular shape in the plan view, rotates according to the rotation of the main spindle 1a, decelerates the rotation of the main spindle 1a, and transmits the decelerated rotation to the magnet Mr. The second sub-shaft gear 50 is pivotally supported around a rotation axis extending substantially vertically from the base portion 3b of the gear base part 3. The second sub-shaft gear 50 includes the second spur gear part 51 and a magnet holding part configured to hold the magnet Mr.

The second spur gear part 51 is provided on an outer periphery of the second sub-shaft gear 50 so that a central axis of the second spur gear part 51 matches or substantially matches the central axis of the first spur gear part 32. The second spur gear part 51 is provided to mesh with the first spur gear part 32 and rotate according to the rotation of the third worm wheel part 31. A rotation axis of the second spur gear part 51 is provided parallel to or substantially parallel to the rotation axis of the first spur gear part 32. The second sub-shaft gear 50 can be formed of various materials such as a resin material or a metal material. The second sub-shaft gear 50 is formed of a polyacetal resin.

Hereinafter, a direction of the first worm wheel part 21 facing the first worm gear part 11 to mesh with the first worm gear part 11 is referred to as a first meshing direction P1 (direction of arrow P1 in FIG. 4). Similarly, a direction of the second worm gear part 22 facing the second worm wheel part 41 to mesh with the second worm wheel part 41, is referred to as a second meshing direction P2 (direction of arrow P2 in FIG. 4). Moreover, a direction of the third worm gear part 28 facing the third worm wheel part 31 to mesh with the third worm wheel part 31 is referred to as a third meshing direction P3 (direction of arrow P3 in FIG. 4). In the present embodiment, the first meshing direction P1, the second meshing direction P2, and the third meshing direction P3 are all directions along a horizontal plane (XY plane).

The magnet Mp is fixed to an upper surface of the main spindle gear 10 so that the central axes of the magnet Mp and the main spindle gear 10 match or substantially match each other. The magnet Mp is supported by a magnet support part 17 provided on a central axis of the main spindle gear 10 via a holder part 16. The holder part 16 is formed of a non-magnetic body such as an aluminum alloy. An inner peripheral surface of the holder part 16 is formed, for example, in an annular shape corresponding to an outer diameter of the magnet Mp and the shape of an outer peripheral surface of the magnet Mp so as to be in contact with the outer peripheral surface of the magnet Mp in a radial direction and to hold the outer peripheral surface. Furthermore, an inner peripheral surface of the magnet support part 17 is formed, for example, in an annular shape corresponding to an outer diameter of the holder part 16 and the shape of an outer peripheral surface of the holder part 16 so as to be in contact with the outer peripheral surface of the holder part 16. The magnet Mp has bipolar magnetic poles arranged in a direction perpendicular to a rotation axis of the main spindle gear 10. In order to detect a rotation angle of the main spindle gear 10, the angle sensor Sp is provided on a lower surface 5a of the angle sensor support substrate 5 so that a lower surface of the angle sensor Sp faces the upper surface of the magnet Mp in the vertical direction via a gap.

As an example, the angle sensor Sp is fixed to the angle sensor support substrate 5 supported by a substrate post 110 disposed at the gear base part 3 to be described below in the absolute encoder 2. The angle sensor Sp detects the magnetic pole of the magnet Mp, and outputs detection information to the microcomputer 121. The microcomputer 121 specifies the rotation angle of the main spindle gear 10, that is, a rotation angle of the main spindle 1a, by specifying a rotation angle of the magnet Mp on the basis of the received magnetic pole-related detection information. The resolution of the rotation angle of the main spindle 1a corresponds to the resolution of the angle sensor Sp. As will be described below, the microcomputer 121 specifies the amount of rotation of the main spindle 1a on the basis of a specified rotation angle of the first sub-shaft gear 40 and the specified rotation angle of the main spindle 1a, and outputs the specified amount of rotation. As an example, the microcomputer 121 may output the amount of rotation of the main spindle 1a of the motor 1 as a digital signal.

The angle sensor Sq detects the rotation angle of the second worm wheel part 41, that is, the rotation angle of the first sub-shaft gear 40. The magnet Mq is fixed to an upper surface of the first sub-shaft gear 40 so that the central axes of the magnet Mq and the first sub-shaft gear 40 match or substantially match each other. The magnet Mq has bipolar magnetic poles arranged in a direction perpendicular to a rotation axis of the first sub-shaft gear 40. As illustrated in FIG. 3, in order to detect the rotation angle of the first sub-shaft gear 40, the angle sensor Sq is provided so that a lower surface of the angle sensor Sq faces an upper surface of the magnet Mq in the vertical direction via a gap.

As an example, the angle sensor Sq is fixed to the angle sensor support substrate 5 on the same surface as the surface where the angle sensor Sp is fixed, the angle sensor Sp being fixed to the angle sensor support substrate 5. The angle sensor Sq detects the magnetic pole of the magnet Mq, and outputs detection information to the microcomputer 121. The microcomputer 121 specifies a rotation angle of the magnet Mq, that is, the rotation angle of the first sub-shaft gear 40, on the basis of the received magnetic pole-related detection information.

The angle sensor Sr detects a rotation angle of the second spur gear part 51, that is, a rotation angle of the second sub-shaft gear 50. The magnet Mr is fixed to an upper surface of the second sub-axis gear 50 so that the central axes of the magnet Mr and the second sub-shaft gear 50 match or substantially match each other. The magnet Mr has bipolar magnetic poles arranged in a direction perpendicular to a rotation axis of the second sub-shaft gear 50. As illustrated in FIG. 3, in order to detect the rotation angle of the second sub-shaft gear 50, the angle sensor Sr is provided so that a lower surface of the angle sensor Sr faces an upper surface of the magnet Mr in the vertical direction via a gap.

As an example, the angle sensor Sr is fixed to the angle sensor support substrate 5 supported by the substrate post 110 disposed at the gear base part 3 to be described below in the absolute encoder 2. The angle sensor Sr detects the magnetic pole of the magnet Mr, and outputs detection information to the microcomputer 121. The microcomputer 121 specifies a rotation angle of the magnet Mr, that is, the rotation angle of the second sub-shaft gear 50, on the basis of the received magnetic pole-related detection information.

A magnetic angle sensor having a relatively high resolution may be used for each magnetic sensor. The magnetic angle sensor is disposed to face an end face including magnetic poles of each permanent magnet in the axial direction of each rotating body via a certain gap, specifies a rotation angle of an opposing rotating body on the basis of the rotation of these magnetic poles, and outputs a digital signal. Examples of the magnetic angle sensor include a detection element configured to detect a magnetic pole and an arithmetic circuit configured to output a digital signal on the basis of the output of the detection element. The detection element may include, for example, a plurality of (for example, four) magnetic field detection elements such as a Hall element or a giant magneto-resistive (GMR) element.

The arithmetic circuit may specify, for example, a rotation angle by table processing using a look-up table using, as a key, the difference or ratio of the outputs of the plurality of detection elements. The detection element and the arithmetic circuit may be integrated on one IC chip. This IC chip may be embedded in a resin having a thin rectangular parallelepiped outer shape. Each magnetic sensor outputs an angle signal to the microcomputer 121 as a digital signal corresponding to the rotation angle of each rotating body detected via a wiring member (not illustrated). For example, each magnetic sensor outputs the rotation angle of each rotating body as a digital signal of multiple bits (for example, 7 bits).

Figure 9:
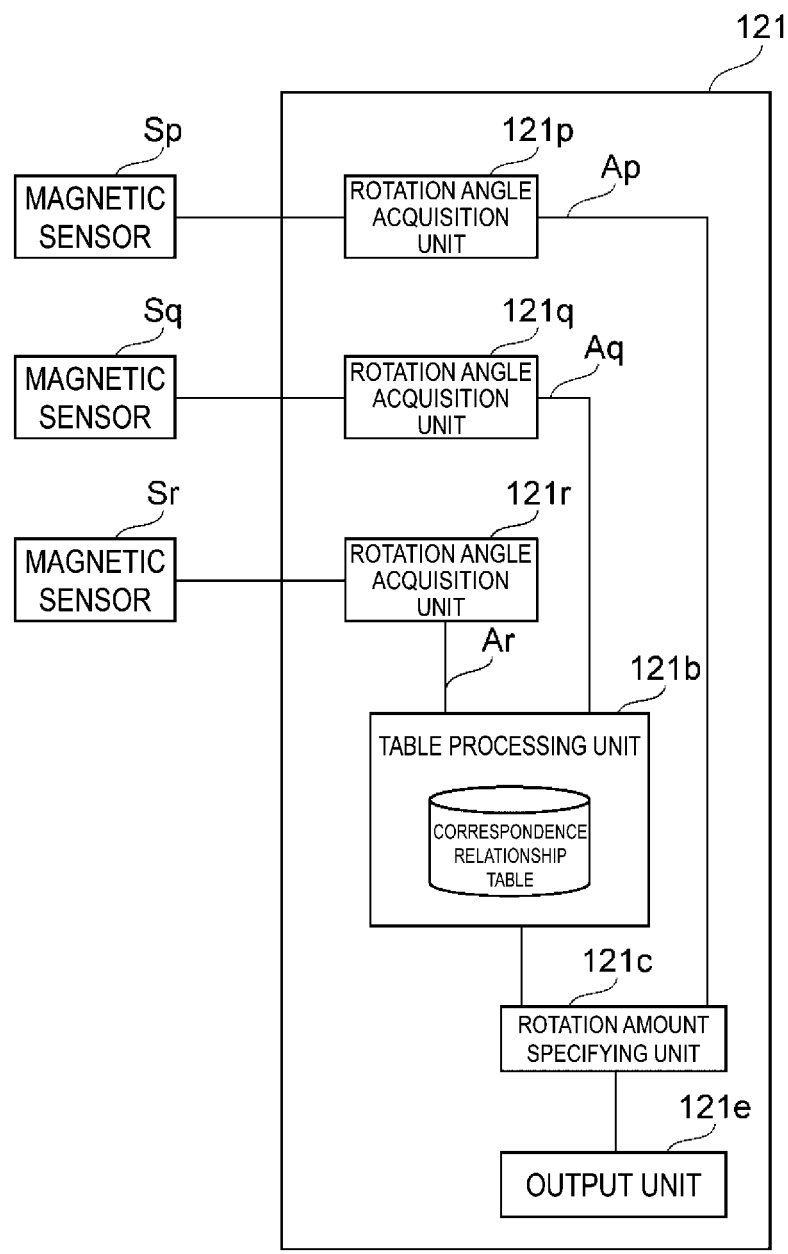
FIG. 9 is a block diagram schematically illustrating a functional configuration of the absolute encoder illustrated in FIG. 1.
Figure 10:
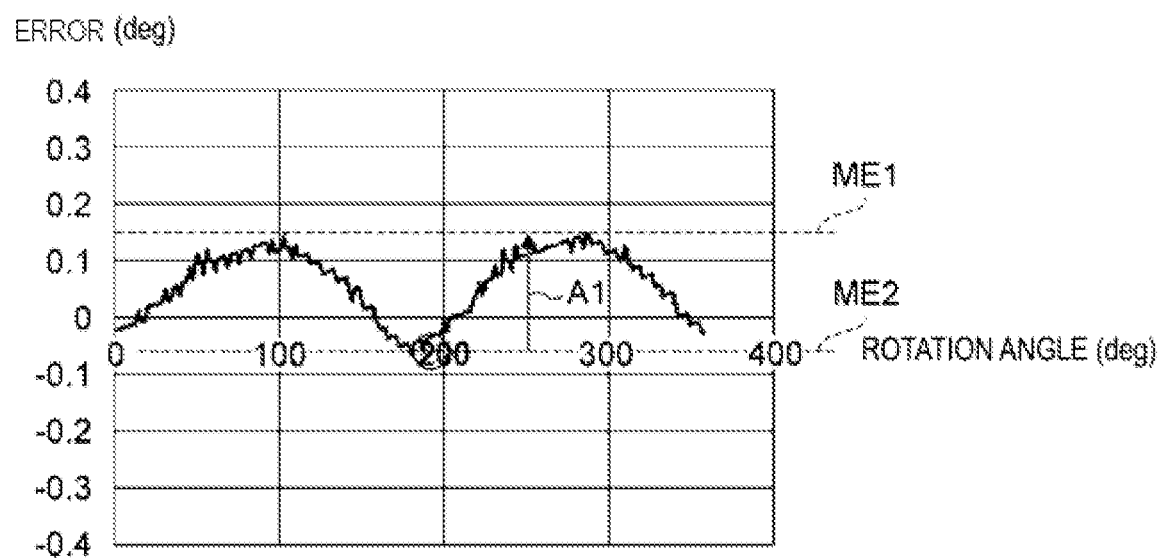
FIG. 10 is a graph showing an example of a reference angle and an angle error of a rotation angle of a first worm gear in the absolute encoder illustrated in FIG. 1.

FIG. 9 is a diagram illustrating a functional configuration of the microcomputer 121 included in the absolute encoder 2. The microcomputer 121 is fixed to a surface of the angle sensor support substrate 5 by a method such as soldering or bonding, the surface facing the base portion 3b of the gear base part 3. The microcomputer 121 includes a CPU, acquires the digital signal output from each of the angle sensors Sp, Sq, and Sr and representing the rotation angle, and calculates the amount of rotation of the main spindle gear 10. Each block of the microcomputer 121 illustrated in FIG. 10 represents a function implemented by the CPU as the microcomputer 121 executing a program. Each block of the microcomputer 121 can be implemented by an element or a mechanical device such as a central processing unit (CPU) or a random access memory (RAM) of a computer, in terms of hardware, and is implemented by a computer program or the like in terms of software, but in the present specification, function blocks implemented by cooperation of hardware and software are drawn. Accordingly, it is understood by those skilled in the art who have read the present specification that these functional blocks can be implemented in various forms by combining hardware and software.

The microcomputer 121 includes a rotation angle acquisition unit 121p, a rotation angle acquisition unit 121q, a rotation angle acquisition unit 121r, the table processing unit 121b, the rotation amount specifying unit 121c, and the output unit 121e. The rotation angle acquisition unit 121p acquires a rotation angle Ap as angle information indicating the rotation angle of the main spindle gear 10, that is, the main spindle 1a, on the basis of a signal output from the angle sensor Sp. The rotation angle acquisition unit 121q acquires a rotation angle Aq as angle information indicating the rotation angle of the first sub-shaft gear 40 on the basis of a signal output from the angle sensor Sq. The rotation angle acquisition unit 121r acquires a rotation angle Ar as angle information indicating the rotation angle of the second sub-shaft gear 50 detected by the angle sensor Sr.

The table processing unit 121b refers to a first correspondence relationship table with the rotation angle Ap and the number of rotations of the main spindle gear 10 corresponding to the rotation angle Ap stored and specifies the number of rotations of the main spindle gear 10 corresponding to the acquired rotation angle Ap. Furthermore, the table processing unit 121b refers to a second correspondence relationship table with the rotation angle Ar and the number of rotations of the main spindle gear 10 corresponding to the rotation angle Ar stored and specifies the number of rotations of the main spindle gear 10 corresponding to the acquired rotation angle Ar.

The rotation amount specifying unit 121c specifies a first amount of rotation over a plurality of rotations of the main spindle gear 10 according to the number of rotations of the main spindle gear 10 specified by the table processing unit 121b and the acquired rotation angle Aq. The output unit 121e converts the amount of rotation of the main spindle gear 10 specified by the rotation amount specifying unit 121c over the plurality of rotations into information indicating the amount of rotation, and outputs the information.

The table processing unit 121b, the rotation amount specifying unit 121c, and the output unit 121e also function as an angle position information output unit configured to output angle position information of the first worm gear part 11 to be described below to an external control device (controller). Furthermore, the table processing unit 121b, the rotation amount specifying unit 121c, and the output unit 121e also output angle error information for correcting the angle position information of the first worm gear part 11 to be described below to the external control device.

The absolute encoder 2 configured in this way can specify the number of rotations of the main spindle 1a according to the rotation angles of the first sub-shaft gear 40 and the second sub-shaft gear 50 specified on the basis of the detection information of the angle sensors Sq and Sr, and specify the rotation angle of the main spindle 1a on the basis of the detection information of the angle sensor Sp. Then, the microcomputer 121 specifies the amount of rotation of the main spindle 1a over a plurality of rotations on the basis of the specified number of rotations of the main spindle 1a and the specified rotation angle of the main spindle 1a.

The number of rows of the first worm gear part 11 of the main spindle gear 10 provided on the main spindle 1a is, for example, 1, and the number of teeth of the first worm wheel part 21 is, for example, 20. That is, the first worm gear part 11 and the first worm wheel part 21 constitute a first transmission mechanism having a reduction ratio of 20 (=20/1) (see FIG. 4). When the first worm gear part 11 rotates 20 times, the first worm wheel part 21 rotates once. Since the first worm wheel part 21 and the second worm gear part 22 are provided coaxially to form the first intermediate gear 20 and rotate integrally, when the first worm gear part 11 rotates 20 times, that is, when the main spindle 1a and the main spindle gear 10 rotate 20 times, the first intermediate gear 20 rotates once and the second worm gear part 22 rotates once.

The number of rows of the second worm gear part 22 is, for example, 5, and the number of teeth of the second worm wheel part 41 is, for example, 25. That is, the second worm gear part 22 and the second worm wheel part 41 constitute a second transmission mechanism having a reduction ratio of 5 (=25/5) (see FIG. 4). When the second worm gear part 22 rotates five times, the second worm wheel part 41 rotates once. Since the first sub-shaft gear 40 formed by the second worm wheel part 41 rotates integrally with a magnet holder 35 and the magnet Mq as will be described below, when the second worm gear part 22 constituting the first intermediate gear 20 rotates five times, the magnet Mq rotates once. From the above, when the main spindle 1a rotates 100 times, the first intermediate gear 20 rotates five times and the first sub-shaft gear 40 and the magnet Mq rotate once. That is, the number of rotations for 50 rotations of the main spindle 1a can be specified by detection information of the angle sensor Sq regarding the rotation angle of the first sub-shaft gear 40.

The number of rows of the third worm gear part 28 is, for example, 1, and the number of teeth of the third worm wheel part 31 is, for example, 30. That is, the third worm gear part 28 and the third worm wheel part 31 constitute a third transmission mechanism having a reduction ratio of 30 (=30/1) (see FIG. 4). When the third worm gear part 28 rotates 30 times, the third worm wheel part 31 rotates once.

The second intermediate gear 30 formed by the third worm wheel part 31 is provided with the first spur gear part 32 having the central axis matching or substantially matching the central axis of the third worm wheel part 31. Therefore, when the third worm wheel part 31 rotates, the first spur gear part 32 also rotates. Since the first spur gear part 32 meshes with the second spur gear part 51 provided in the second sub-shaft gear 50, when the second intermediate gear 30 rotates, the second sub-shaft gear 50 also rotates.

The number of teeth of the second spur gear part 51 is, for example, 40, and the number of teeth of the first spur gear part 32 is, for example, 24. That is, the first spur gear part 32 and the second spur gear part 51 constitute a fourth transmission mechanism having a reduction ratio of 5/3 (=40/24) (see FIG. 4). When the first spur gear part 32 rotates five times, the second spur gear part 51 rotates three times. Since the second sub-shaft gear 50 formed by the second spur gear part 51 rotates integrally with the magnet Mr as will be described below, when the third worm gear part 28 constituting the first intermediate gear 20 rotates five times, the magnet Mr rotates once. From the above, when the main spindle 1a rotates 1,000 times, the first intermediate gear 20 rotates 50 times, the second intermediate gear 30 rotates 5/3 times, and the second sub-shaft gear 50 and the magnet Mr rotate once. That is, the number of rotations for 1,000 rotations of the main spindle 1a can be specified by detection information of the angle sensor Sr regarding the rotation angle of the second sub-shaft gear 50.

Hereinafter, the configuration of the absolute encoder 2 is described more specifically.

As described above (see FIGS. 1 to 5), the absolute encoder 2 includes the gear base part 3, the case 4, the angle sensor support substrate 5, and the connector 6. Furthermore, the absolute encoder 2 includes the main spindle gear 10, the first intermediate gear 20, the second intermediate gear 30, the first sub-shaft gear 40, and the second sub-shaft gear 50. Furthermore, the absolute encoder 2 includes the magnets Mp, Mq, and Mr and the angle sensors Sp, Sq, and Sr, and also includes the microcomputer 121 for controlling the driving part, the detection part, and the like of the absolute encoder 2.

As described above, the table processing unit 121b, the rotation amount specifying unit 121c, and the output unit 121e also function as the angle position information output unit configured to output the angle position information of the first worm gear part 11 to be described below to the external control device (controller). Furthermore, the table processing unit 121b, the rotation amount specifying unit 121c, and the output unit 121e also output angle error information for correcting the angle position information of the first worm gear part 11 to be described below to the external control device.

Figure 11:
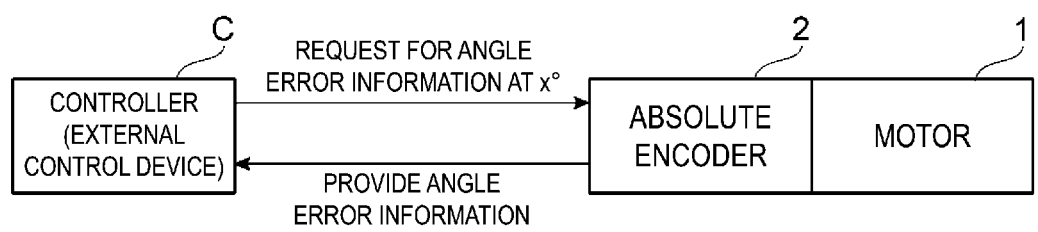
FIG. 11 is a block diagram schematically illustrating a functional configuration of performing an angle error correction processing in the absolute encoder illustrated in FIG. 1.

FIG. 10 is a graph showing an example of a reference angle and an angle error of the rotation angle of the first worm gear part 11 in the absolute encoder 2. Furthermore, FIG. 11 is a block diagram schematically illustrating a functional configuration of performing an angle error correction processing in the absolute encoder 2.

The absolute encoder 2 outputs angle information, that is, the rotation angle of the main spindle 1a, to an external control device (hereinafter referred to as a "controller C") configured to control the motor 1 on the basis of information output from the absolute encoder 2, enabling the controller C to control the operation of the motor 1. The controller C can determine a reference angle for the controller C to control the operation of the motor 1 by obtaining the angle information of the motor 1, that is, the rotation angle of the main spindle 1a from the absolute encoder 2 when the power is turned on.

However, in the absolute encoder 2, the angle sensor Sp has a unique angle error with respect to the position (angle) of the main spindle 1a due to manufacturing variations of gears and the like, or the positional relationship of magnets and magnetic sensors used for detecting a position of a rotating shaft. Therefore, depending on the stopped position of the first worm gear part 11, the angle information output from the absolute encoder 2 to the controller C at power-on may have a value most deviated (separated value) from an actual rotation angle of the main spindle 1a. In a case where the angle information has a value most deviated from the actual rotation angle of the main spindle 1a, the reference angle set by the controller C may deviate from the actual rotation angle of the main spindle 1a by an error A1 of a difference between a maximum value ME1 and a minimum value ME2.

In this regard, the absolute encoder 2 outputs, to the controller C, angle error information indicating, by an angle (for example, deg), how much an output angle output by the angle sensor Sp immediately after the power-on deviates from an actual stopped position of the first worm gear part 11.

As illustrated in FIG. 11, since the controller C side determines the reference angle used for the operation control of the motor 1, the absolute encoder 2 holds an angle error peculiar to the absolute encoder 2, that is, angle error information, caused by manufacturing variations of the absolute encoder 2. The controller C reads, from the absolute encoder 2, the stopped position (angle position information) of the first worm gear part 11 at power-on and angle error information for specifying the amount of error at the stopped position. The controller C corrects the angle position information of the first worm gear part 11 on the basis of the angle error information read from the absolute encoder 2. By doing so, the controller C can determine the reference angle on the basis of the corrected angle position information and control the motor 1. The angle error information is written, for example, in a storage area (for example, RAM) of the microcomputer 121 at the time of shipment from the factory, that is, in the table processing unit 121b.

Next, a method for outputting angle error information (angle error information output processing) performed in the absolute encoder 2 is specifically described.

In the absolute encoder 2, the angle error information output processing is performed by causing the microcomputer 121 capable of executing a computer program to execute a program for outputting angle error information of the absolute encoder.

Figure 12:
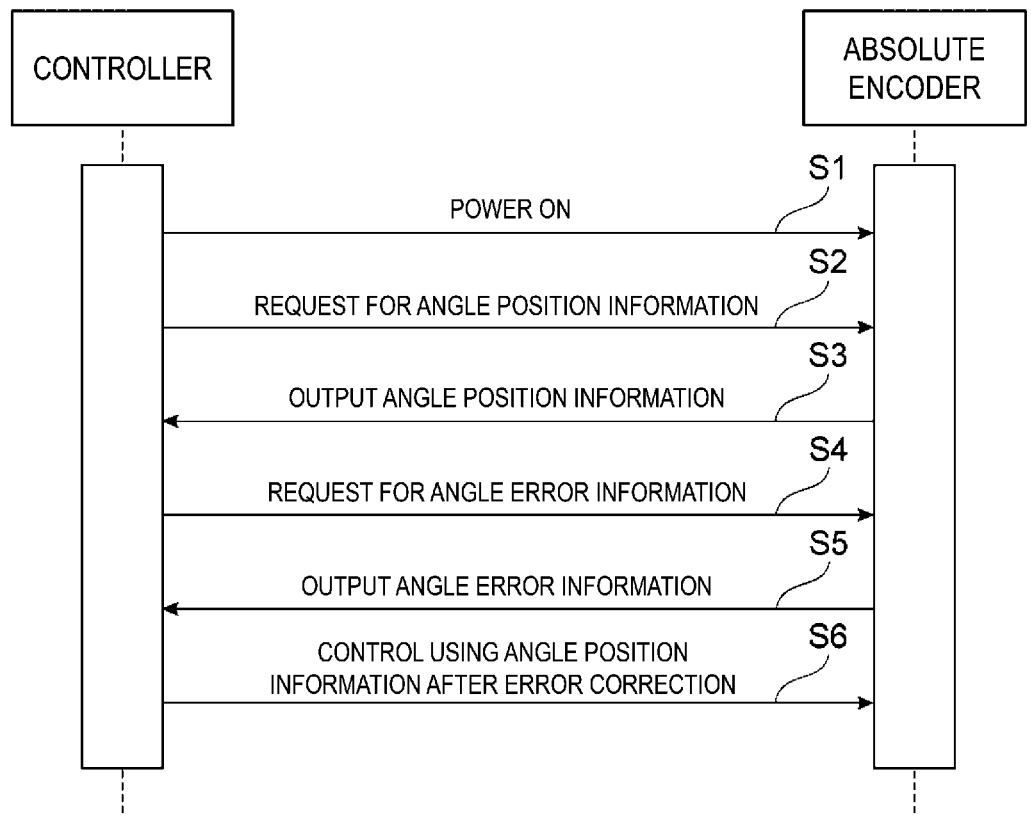
FIG. 12 is a sequence diagram illustrating an example of an angle error correction processing in the absolute encoder illustrated in FIG. 1.

FIG. 12 is a sequence diagram illustrating an example of an angle error correction processing in the absolute encoder 2. As illustrated in FIG. 12, the absolute encoder 2 performs the following processing.

The controller C transmits a request (command) to turn on the power (power on) of the absolute encoder 2 (step S1).

The controller C transmits angle position information request information to request the absolute encoder 2 for angle position information of the first worm gear part 11 in a stopped state, that is, angle information indicating the position of the main spindle 1a in the circumferential direction at power-on (step S2).

In the absolute encoder 2, the following processing is performed as an angle position information output step. That is, upon receiving the angle position information request information from the controller C, the table processing unit 121b refers to the first correspondence relationship table with the rotation angle Ap acquired immediately after the reception and the number of rotations of the main spindle gear 10 corresponding to the rotation angle Ap stored and specifies the number of rotations of the main spindle gear 10 corresponding to the acquired rotation angle Ap in the stopped state. Furthermore, the table processing unit 121b refers to the second correspondence relationship table with the rotation angle Ar acquired in the stopped state and the number of rotations of the main spindle gear 10 corresponding to the rotation angle Ar stored and specifies the number of rotations of the main spindle gear 10 corresponding to the acquired rotation angle Ar in the stopped state. The rotation amount specifying unit 121c specifies angle position information of the main spindle gear 10, that is, the first worm gear part 11 in the stopped state according to the number of rotations of the main spindle gear 10 read from the table processing unit 121b and the acquired rotation angle Aq. The output unit 121e outputs the angle position information of the first worm gear part 11 in the stopped state to the controller C (step S3).

The controller C having acquired the angle position information calculates information for specifying an address in a recording area (correspondence relationship table of a flash area) of the absolute encoder 2 from the angle position information, that is, information for specifying a storage area of the angle error information corresponding to the angle position information. The controller C transmits the address to the absolute encoder 2 as angle error information request information (step S4).

In the absolute encoder 2, the following processing is performed as an angle error information output step. That is, the table processing unit 121b reads, from a third correspondence relationship table, angle error information of the first worm gear part 11 corresponding to the angle error information request information in response to the request of the controller C. The third correspondence relationship table is a table with a predetermined angle of the first worm gear part 11 and the angle error information stored in correlation with each other. In the absolute encoder 2, the output unit 121e outputs the angle error information of the first worm gear part 11 in the stopped state to the controller C (step S5). The angle error information is set as follows, for example. The angle range of the main spindle 1a (first worm gear part 11) from 0° to 360° is divided at predetermined angle intervals. The divided angles may be the same angle or different angles. For example, the angle range may be divided into 200 at intervals of 1.8° or may be divided into 200 at a plurality of angles such as 1.5°, 1.8° or 2.0°. Furthermore, the number of divisions may be divided into a number other than 200, such as 150 or 300. The angle error information is referred to by assigning error data at a position rounded at an arbitrary angle interval (rounding down decimal places) with respect to the angle position information of the first worm gear part 11 output in step S3. The angle error information is defined by the difference (with plus or minus sign) from the center value of an angle error peculiar to the absolute encoder 2.

Figure 13:
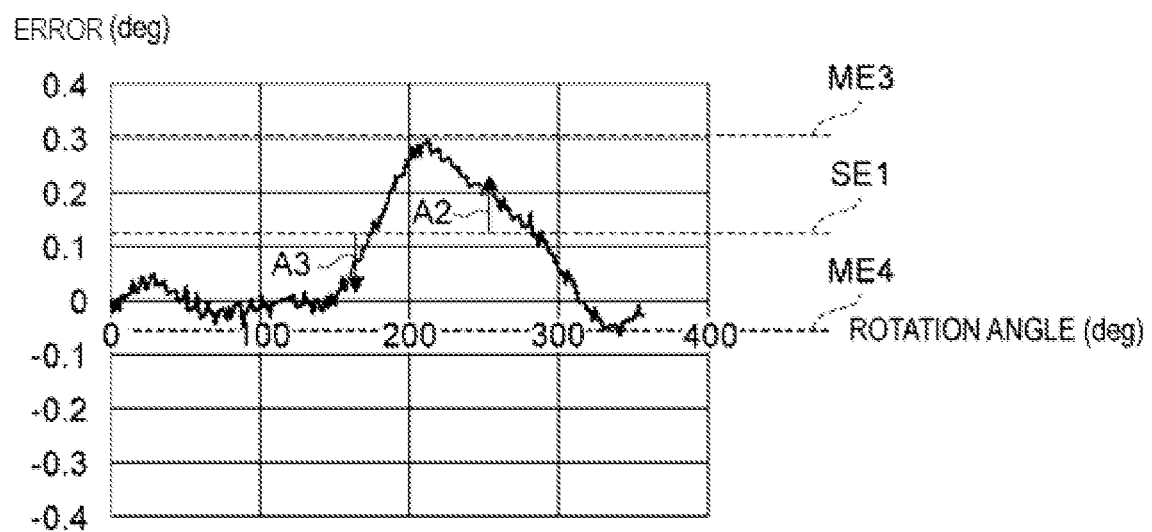
FIG. 13 is a graph showing an example of the calculation criterion of the angle error of the rotation angle of the first worm gear in the absolute encoder illustrated in FIG. 1.

FIG. 13 is a graph showing an example of the calculation criterion of the angle error of the rotation angle of the first worm gear part 11 in the absolute encoder 2.

As illustrated in FIG. 13, in the absolute encoder 2, even when a maximum value ME3 of the angle error is biased in the positive direction, a calculation criterion SE1 of the angle error information can be set to be an intermediate value between the maximum value ME3 and a minimum value ME4 of the angle error. By doing so, according to the absolute encoder 2, an angle error A2 in the positive direction and an angle error A3 in the negative direction can be corrected to a form close to equality.

The controller C sets the angle position information acquired from the absolute encoder 2 (for example, the rotation angle of the first worm gear part 11 at the stopped position at power-on) as a reference angle. The controller C determines a reference angle after correction on the basis of the set reference angle and the acquired angle error information. Specifically, the controller C determines the reference angle after correction by adding the value of an angle to be added to or subtracted from a reference angle before the correction. The controller C treats the added or subtracted reference angle as angle position information after error correction and performs motor control by using the angle position information after error correction (step S6).

As described above, the processing by the absolute encoder 2 enables the controller C side to correct the reference angle of the first worm gear part 11 to a more accurate position. Furthermore, as described above, the processing by the absolute encoder 2 enables the controller C to reduce an actual angle error to half of the error A1 of the difference between the maximum value ME1 and the minimum value ME2 of the maximum angle error.

Next, an example of the reference angle of the angle error information of the first worm gear part 11 in the absolute encoder 2 is described.

Figure 14:
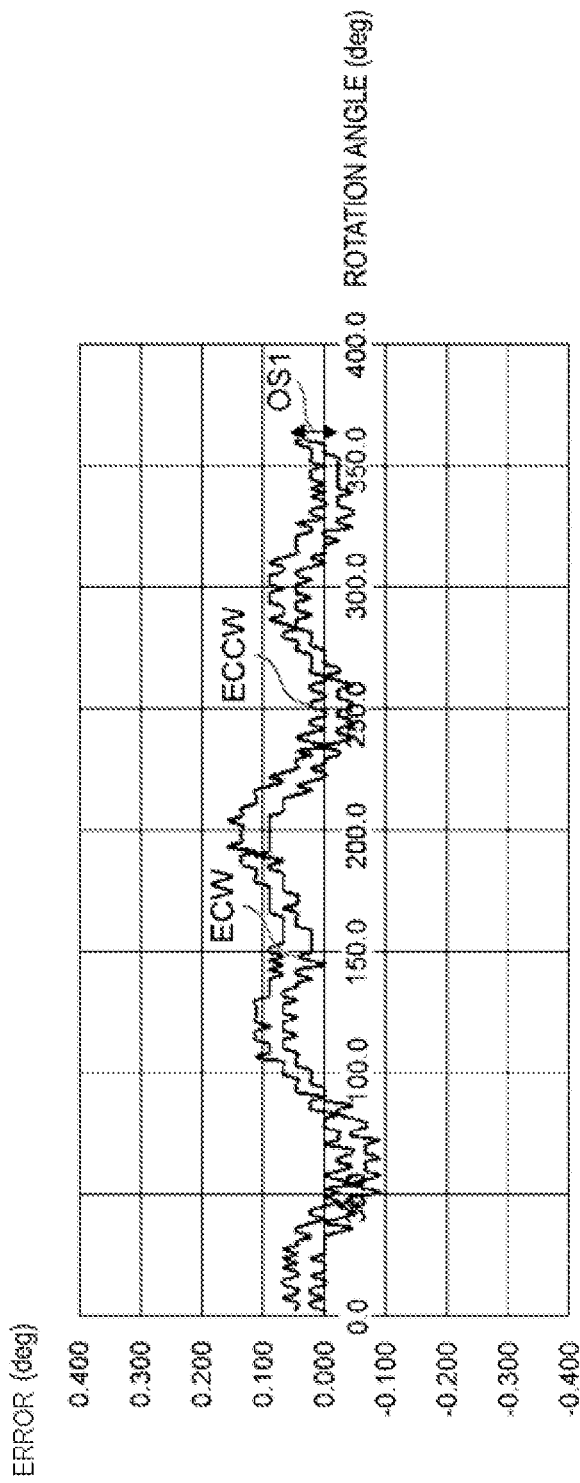
FIG. 14 is a graph showing an example of a difference in angle error depending on the rotation direction of the first worm gear in the absolute encoder illustrated in FIG. 1.

FIG. 14 is a graph showing an example of a difference in the angle error depending on the rotation direction of the first worm gear part 11 in the absolute encoder 2.

In the absolute encoder 2, when the rotation direction is switched (for example, from a normal rotation direction to a reverse rotation direction or from the reverse rotation direction to the normal rotation direction), an offset OS1 of the angle error of the first worm gear part 11 may occur. In this case, as illustrated in FIG. 14, an angle error ECW in the normal rotation direction and an angle error ECCW in the reverse rotation are different. In FIG. 14, the angle error of the first worm gear part 11 is the angle error ECCW in the reverse rotation direction with respect to the angle error ECW in the normal rotation direction. As for the angle error, the offset OS1 occurs in the negative direction. In the absolute encoder 2, when the angle error is corrected only in one direction (for example, the normal rotation direction or the reverse rotation direction), the angle error may exceed an allowable range by the offset OS1 in the rotation in the other direction.

Figure 15:
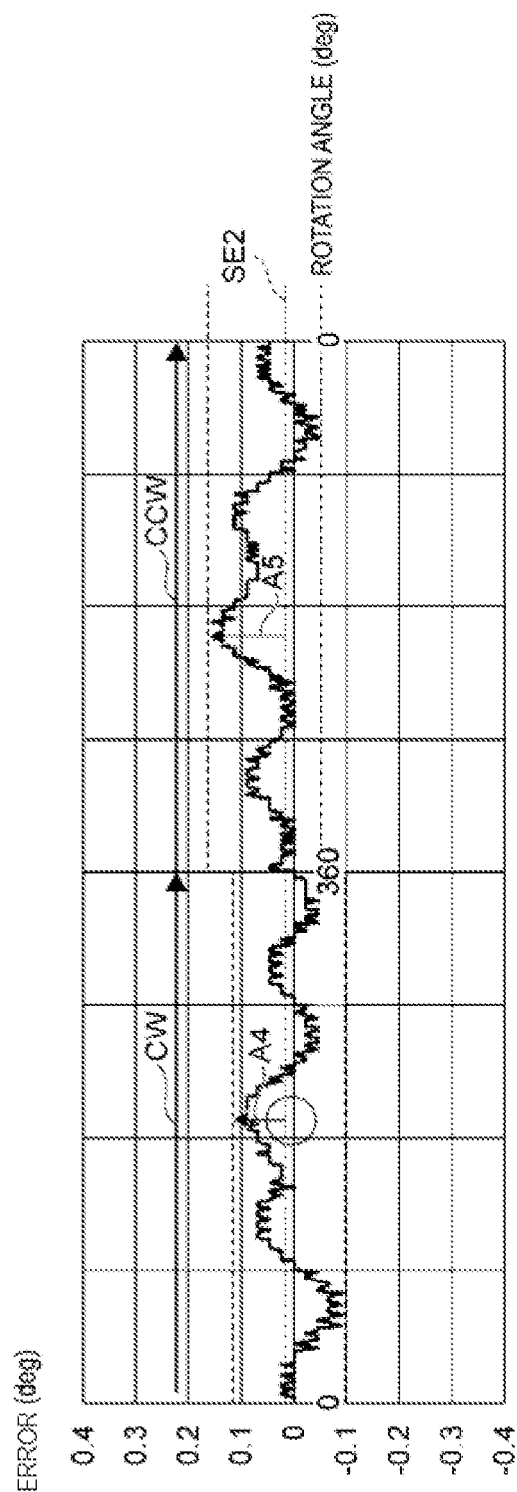
FIG. 15 is a graph showing an example of a difference in angle error after angle error correction depending on the rotation direction of the first worm gear in the absolute encoder illustrated in FIG. 1.

FIG. 15 is a graph showing an example of a difference in the angle error after angle error correction depending on the rotation direction of the first worm gear part 11 in the absolute encoder 2.

As illustrated in FIG. 15, in the absolute encoder 2, setting a reference angle SE2 for the angle error correction on the basis of an error at the time of normal rotation (CW) when the angle error is different between the angle error ECW at the time of normal rotation (CW) and the angle error ECCW at the time of reverse rotation (CCW) causes, for example, in FIG. 15, an angle error A5 in the reverse rotation direction to be larger than an angle error A4 in the normal rotation direction by the offset OS1 as illustrated in FIG. 14 even when the angle position is the same.

Figure 16:
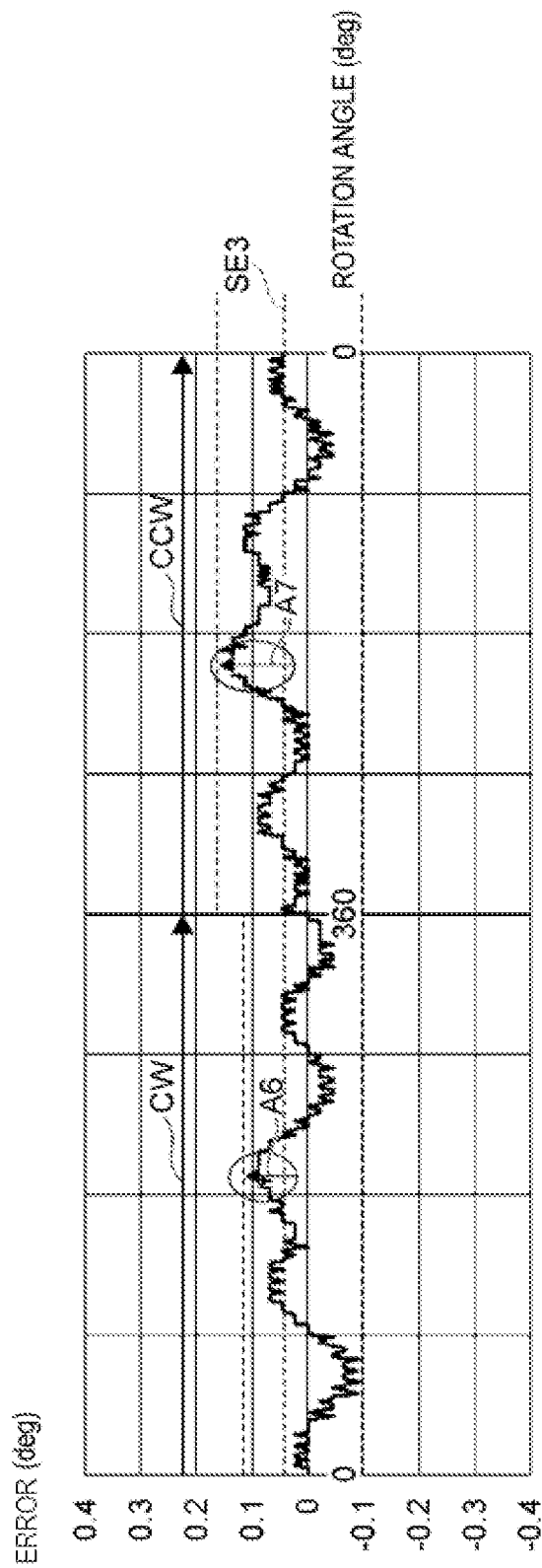
FIG. 16 is a graph showing an example of an angle error after angle error correction for each rotation direction of the first worm gear in the absolute encoder illustrated in FIG. 1.

FIG. 16 is a graph showing an example of the angle error after angle error correction for each rotation direction of the first worm gear part 11 in the absolute encoder 2.

In this regard, as illustrated in FIG. 16, in the absolute encoder 2, the angle error ECW at the time of forward rotation (CW) and the angle error ECCW at the time of reverse rotation (CCW) are measured. The reference angle SE3 is an intermediate value between a maximum value and a minimum value in a range combining the rotation in the normal rotation direction and the rotation in the reverse rotation direction. Of angle errors at the same angle position in the normal rotation direction and the reverse rotation direction with the reference angle SE3 as a center, an angle error having a large difference from the reference position is stored in a correspondence relationship table as angle error information. In this way, when the angle errors are different, the reference angle SE3 for the angle error correction is taken into consideration for errors at the time of normal rotation (CW) and at the time of reverse rotation (CCW), and an angle error having a large difference is set in the correspondence relationship table as the angle error information, and thus, an error between the normal rotation direction and the reverse rotation direction is not biased, and a maximum angle error can be reduced.

Next, another example of the angle error correction processing of the first worm gear part 11 in the absolute encoder 2 is described.

Figure 17:
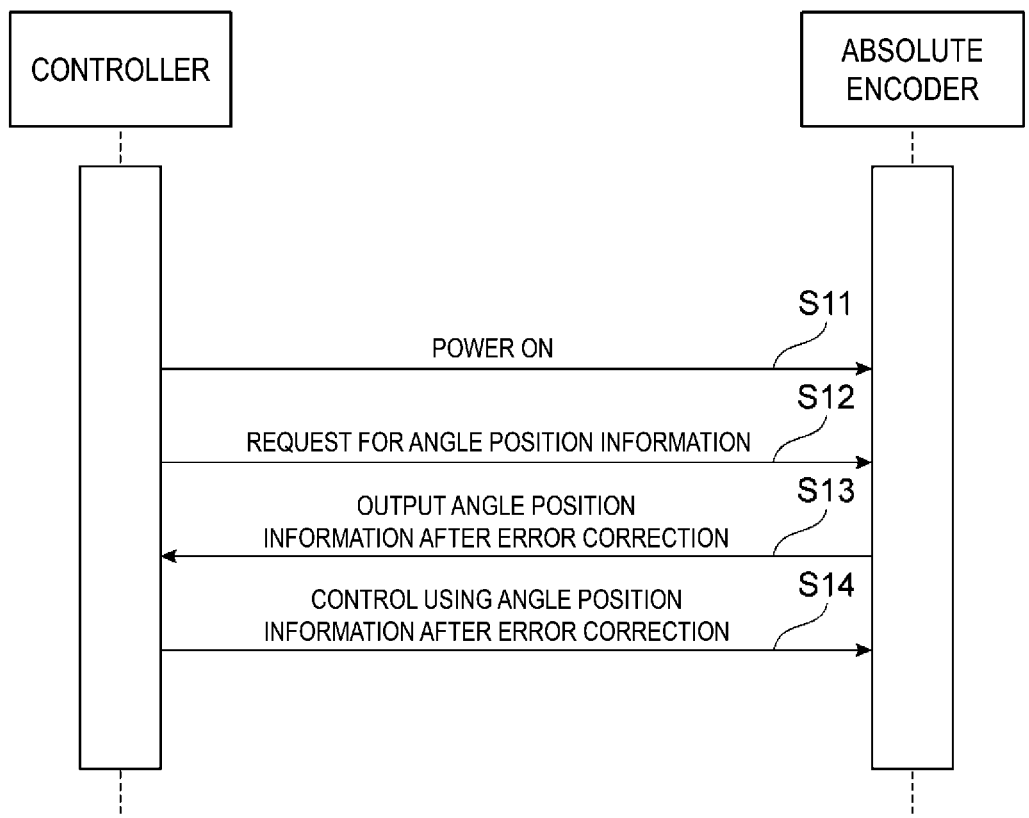
FIG. 17 is a sequence diagram illustrating another example of an angle error correction processing in the absolute encoder illustrated in FIG. 1.

FIG. 17 is a sequence diagram illustrating another example of the angle error correction processing in the absolute encoder 2.

In the example of the angle error correction processing in the absolute encoder 2 illustrated in FIG. 12, the absolute encoder 2 outputs the angle position information and the angle error information in response to the request of the controller C. The angle error correction processing according to the present invention is not limited to the above example, and as in the sequence diagram illustrated in FIG. 17, for example, angle error information after error correction with the angle error information added may be output to the controller C in response to the request of the controller C.

The controller C transmits a request (command) to turn on the power (power on) of the absolute encoder 2 (step S11).

The controller C requests the absolute encoder 2 for angle position information of the first worm gear part 11 in a stopped state, that is, angle information indicating the position of the main spindle 1a in the circumferential direction at power-on (step S12).

In the absolute encoder 2, the table processing unit 121b refers to, in response to the request from the controller C, the first correspondence relationship table with the rotation angle Ap acquired immediately after the reception and the number of rotations of the main spindle gear 10 corresponding to the rotation angle Ap stored and specifies the number of rotations of the main spindle gear 10 corresponding to the acquired rotation angle Ap in the stopped state. Furthermore, the table processing unit 121b refers to the second correspondence relationship table with the rotation angle Ar acquired in the stopped state and the number of rotations of the main spindle gear 10 corresponding to the rotation angle Ar stored and specifies the number of rotations of the main spindle gear 10 corresponding to the acquired rotation angle Ar in the stopped state. The rotation amount specifying unit 121c specifies angle position information of the main spindle gear 10, that is, the first worm gear part 11 in the stopped state according to the number of rotations of the main spindle gear 10 read from the table processing unit 121b and the acquired rotation angle Aq.

In the absolute encoder 2, the table processing unit 121b reads angle error information of the first worm gear part 11 corresponding to the specified angle position information from the correspondence relationship table. In the absolute encoder 2, the table processing unit 121b calculates angle position information after error correction on the basis of the angle error information of the first worm gear part 11 in the stopped state. The output unit 121e outputs the angle position information after error correction to the controller C (step S13).

The controller C sets, as a reference angle, a rotation angle of the first worm gear part 11 at a predetermined angle position, for example, at the stopped position at power-on. The controller C determines, for the reference angle, a corrected reference angle with the acquired angle error information added, specifically, the value of an angle to be added to or subtracted from the reference angle before the correction. The controller C treats the added or subtracted reference angle as angle position information after error correction and performs motor control by using the angle position information after error correction (step S14).

By the above processing, the absolute encoder 2 can prevent an angle error in the controller C as described above, and reduce a load on the processing capacity of the controller C.

The embodiment of the present invention has been described above; however, the present invention is not limited to the absolute encoder 2 according to the embodiment of the present invention described above, and includes all aspects included in the concepts and claims of the present invention. Furthermore, the respective configurations may be selectively combined as appropriate or may be combined with a known technology so as to achieve at least a part of the above-described problems and the effects. For example, a shape, a material, an arrangement, a size, and the like of each of the components in the embodiment described above may be changed as appropriate according to a specific usage aspect of the present invention.

In the embodiment described above, the angle error correction processing according to the present invention is applied to the angle error of the first worm gear part 11 related to the main spindle 1a of the motor 1; however, the present invention is not limited to the application and is also applicable to, for example, the first sub-shaft gear 40 and/or the second sub-shaft gear 50. In this case, the angle position information and the angle error information of the first sub-shaft gear 40 and/or the second sub-shaft gear 50 are processed in the absolute encoder 2 as illustrated in FIG. 17.

REFERENCE SIGNS LIST

1 Motor
1a Main spindle
1b Press-fitting part
2 Absolute encoder
3 Gear base part
4 Case
4a Outer wall portion
5 Angle sensor support substrate
5a Lower surface
6 Connector
7 Shield plate
8a Substrate mounting screw
8c Gear base part fixing screw
8e Screw
10 Main spindle gear
11 First worm gear part
16 Holder part
17 Magnet support part
20 First intermediate gear
21 First worm wheel part
22 Second worm gear part
23 Shaft
28 Third worm gear part
30 Second intermediate gear
31 Third worm wheel part
32 First spur gear part
35 Magnet holder
40 First sub-shaft gear
41 Second worm wheel part
50 Second sub-shaft gear
51 Second spur gear part
121 Microcomputer
121b Table processing unit
121c Rotation amount specifying unit
121e Output unit
121p Rotation angle acquisition unit
121q Rotation angle acquisition unit
121r Rotation angle acquisition unit
Mp, Mq, Mr Magnet
Sp, Sq, Sr Angle sensor

The invention claimed is:

1. An absolute encoder, comprising:
a first driving gear configured to rotate according to rotation of a main spindle;
a permanent magnet rotatable together with the first driving gear;
an angle sensor configured to detect a rotation angle of the first driving gear corresponding to a change in a magnetic flux generated from the permanent magnet;
a microcomputer configured to output angle position information of the first driving gear in a stopped state;
wherein the microcomputer outputs angle error information of the first driving gear corresponding to the angle position information, and
the microcomputer sets the angle error information based on the position in the stopped state, in accordance with an intermediate value between a maximum value and a minimum value of an angle error with respect to a rotation angle of the first driving gear.

2. The absolute encoder according to claim 1, wherein the microcomputer outputs, in response to angle position information request information from an external control device, the angle position information to the external control device.

3. The absolute encoder according to claim 1, wherein the microcomputer outputs, in response to angle error information request information from the external control device, the angle error information to the external control device.

4. The absolute encoder according to claim 1, wherein the microcomputer outputs the angle error information to the microcomputer, and
the microcomputer corrects the angle position information in response to the angle error information and outputs corrected angle position information to the external control device.

5. The absolute encoder according to claim 1, wherein the microcomputer outputs the angle error information in response to an angle error in a normal rotation direction and an angle error in a reverse rotation direction of the first driving gear.

6. Non-transitory storage that stores a program for outputting angle error information of an absolute encoder, the absolute encoder comprising:
a first driving gear configured to rotate according to rotation of a main spindle;
a permanent magnet rotatable together with the first driving gear; and an angle sensor configured to detect a rotation angle of the first driving gear corresponding to a change in a magnetic flux generated from the permanent magnet, the program for outputting angle error information causing a computer to:

output angle position information of the first driving gear in a stopped state;

output angle error information of the first driving gear corresponding to the angle position information; and set the angle error information based on the position in the stopped state, in accordance with an intermediate value between a maximum value and a minimum value of an angle error with respect to a rotation angle of the first driving gear.

7. A method for outputting angle error information of an absolute encoder, the absolute encoder comprising:

a first driving gear configured to rotate according to rotation of a main spindle;

a permanent magnet rotatable together with the first driving gear; and an angle sensor configured to detect a rotation angle of the first driving gear corresponding to a change in a magnetic flux generated from the permanent magnet, the method for outputting angle error information comprising:

by a computer, outputting angle position information of the first driving gear in a stopped state;

outputting angle error information of the first driving gear corresponding to the angle position information; and setting the angle error information in accordance with an intermediate value between a maximum value and a minimum value of an angle error with respect to a rotation angle of the first driving gear.

* * * * *